US012606139B2

(12) United States Patent
Subramanian et al.

(10) Patent No.: US 12,606,139 B2
(45) Date of Patent: Apr. 21, 2026

(54) SYSTEM AND METHOD FOR HANDLING BRAKING OF COMBINATION VEHICLE INCLUDING UPDATING OF BRAKE PEDAL POSITION DECELERATION MAP

(71) Applicant: Volvo Truck Corporation, Gothenburg (SE)

(72) Inventors: Chidambaram Subramanian, Jamestown, NC (US); Gabriel Einstoss, Greensboro, NC (US)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/897,230

(22) Filed: Sep. 26, 2024

(65) Prior Publication Data

US 2026/0084671 A1    Mar. 26, 2026

(51) Int. Cl.
B60T 8/58        (2006.01)
B60T 8/17        (2006.01)
        (Continued)

(52) U.S. Cl.
CPC ............. *B60T 8/58* (2013.01); *B60T 8/1708* (2013.01); *B60T 8/171* (2013.01); *B60T 8/172* (2013.01);
        (Continued)

(58) Field of Classification Search
CPC .......... B60T 8/58; B60T 8/1708; B60T 8/171; B60T 8/172; B60T 2210/10; B60T 2220/04; B60T 2250/02; B60T 2250/04
        (Continued)

(56) References Cited

U.S. PATENT DOCUMENTS

2004/0068358 A1    4/2004  Walenty et al.
2012/0139330 A1    6/2012  Morishita
        (Continued)

FOREIGN PATENT DOCUMENTS

CN        104512397 A    4/2015
CN        109501787 A    3/2019
        (Continued)

OTHER PUBLICATIONS

Extended European Search Report for European Patent Application No. 25197884.7, mailed Feb. 4, 2026, 7 pages.

*Primary Examiner* — Hai H Huynh
(74) *Attorney, Agent, or Firm* — Withrow & Terranova, PLLC

(57)        ABSTRACT

A method for handling braking of a combination vehicle (i.e., a towing vehicle and at least one trailer) includes vehicle-specific dynamic updating and implementation of a brake pedal position deceleration map, including utilization of brake pedal position information and vehicle motion information in conjunction with a brake pedal position deceleration map to trigger braking, determining an error in actual deceleration relative to a target deceleration is determined, checking whether compensation for the determined error would be limited by a trailer brake saturation limit, determining an adjustment of brake pedal position to correct deceleration when the determined error is limited by the trailer brake saturation limit, classifying the adjustment into one or more predefined correction categories, updating the brake pedal position deceleration map when the classified adjustment indicates remapping is needed, and utilizing the updated map in actuating brakes of the vehicle. A combination vehicle including a processor configured to perform the method, and a computer-readable storage medium, are further provided.

20 Claims, 5 Drawing Sheets

(51) Int. Cl.
B60T 8/171 (2006.01)
B60T 8/172 (2006.01)
(52) U.S. Cl.
CPC ....... *B60T 2210/10* (2013.01); *B60T 2220/04*
(2013.01); *B60T 2250/02* (2013.01); *B60T*
*2250/04* (2013.01)
(58) Field of Classification Search
USPC ......................................................... 701/70
See application file for complete search history.

(56) References Cited

U.S. PATENT DOCUMENTS

| | | | |
|---|---|---|---|
| 2015/0097416 A1 | 4/2015 | Ueura et al. | |
| 2015/0321649 A1 | 11/2015 | Jeon | |
| 2016/0107625 A1 | 4/2016 | Shand et al. | |
| 2021/0213918 A1 | 7/2021 | Chen et al. | |
| 2023/0339439 A1 | 10/2023 | Dulai et al. | |
| 2023/0399029 A1 | 12/2023 | Yuan et al. | |
| 2024/0034290 A1 | 2/2024 | Subramanian | |
| 2024/0051511 A1 | 2/2024 | Subramanian | |

FOREIGN PATENT DOCUMENTS

| | | | |
|---|---|---|---|
| DE | 102020201901 A1 | 8/2021 | |
| EP | 2570317 A1 | 3/2013 | |
| JP | 2014118065 A | 6/2014 | |
| JP | 2015145136 A | 8/2015 | |
| JP | 6297344 B2 | 3/2018 | |
| WO | 2017050553 A1 | 3/2017 | |

SYSTEM AND METHOD FOR HANDLING BRAKING OF COMBINATION VEHICLE INCLUDING UPDATING OF BRAKE PEDAL POSITION DECELERATION MAP

TECHNICAL FIELD

The disclosure relates to braking of an automotive vehicle. In particular aspects, the disclosure relates to handling braking of a combination vehicle including at least one trailer. The disclosure can be applied to heavy-duty combination vehicles, such as trucks and construction equipment, among other vehicle types. Although the disclosure may be described with respect to a particular vehicle, the disclosure is not restricted to any particular vehicle.

BACKGROUND

Heavy duty vehicles including trucks frequently utilize electro-pneumatic braking systems that use pressurized air as a working fluid. In the context of combination vehicles (e.g., trucks) including a towing vehicle and at least one trailer, prior to the addition of electronic controls, brake pedal feeling would be drastically different depending on the type of towing vehicle (e.g., 6×4 or 6×2), type of trailer(s), number of trailers, and loading condition (e.g., loaded versus unloaded).

Electronic controls on top of baseline pneumatic systems (i.e., electronic braking or 'brake by wire' systems) have been developed to provide advanced capabilities and improved response at wheel axles of combination vehicles. Electronic braking systems have increased robustness and stability of brake pedal movement, such that a driver may perceive less dramatic differences in brake pedal feel between different vehicles or different conditions.

In an electronic braking system, a pedal position sensor senses how far a driver has pushed a brake pedal, and brake pedal position is used to determine the amount of braking force that is requested. Pedal position information is supplied by an electronic control unit (ECU) to an electronic pressure modulator (EPM) that can deliver controlled amounts of compressed air to each axle. The ECU may utilize a pre-defined pedal map that maps deceleration to brake pedal position. Using this target deceleration, the system may apply brakes between a towing vehicle and trailer(s) to reach a deceleration target. In particular, towing vehicle brakers are applied based on predetermined wheel-end brake characteristics of the towing vehicle, and any non-attainment of a target deceleration (i.e., deceleration error) is attributed to the trailer(s), such that the trailer braking is increased or decreased accordingly to seek to meet the target deceleration. However, when adjusting trailer braking, trailer braking pressure will not be increased or decreased beyond certain limits to ensure functional safety, since over-correction may lead to an unsafe condition. Thus, even with use of electronic braking systems, sub-optimal brake pedal feel remains a concern in the art, since the towing vehicle blames any trailers for non-attainment of a target deceleration, and the electronic braking system will try to adapt trailer braking only within certain boundary limits. Problems will brake pedal feel will be more prevalent when combination vehicles include heavily loaded trailers, a large number of trailers, incorrectly characterized wheel ends (e.g., disc versus drum combinations), etc.

SUMMARY

According to a first aspect of the disclosure, a method for handling braking of a combination vehicle including a towing vehicle and at least one trailer is provided, the method comprising: periodically receiving, at a processor, (i) brake pedal position information for a towing vehicle brake pedal actuated by a driver to indicate an intended braking effect, and (ii) vehicle motion information of the combination vehicle, as inputs to a brake pedal position deceleration map; utilizing, by the processor, said brake pedal position information, said vehicle motion information, and said brake pedal position deceleration map to determine a target deceleration of the combination vehicle, and responsive to the determined target deceleration, trigger actuation of brakes of the combination vehicle by transmitting a towing vehicle braking request to the towing vehicle and by transmitting a trailer braking request to the at least one trailer; determining, by the processor, an error in actual deceleration of the combination vehicle relative to the target deceleration, and responsive to the determined error, adjusting the trailer braking request to compensate for the determined error, but wherein compensation for the determined error is subject to being limited by a trailer brake saturation limit; determining, by the processor, an adjustment of brake pedal position by the driver of the towing vehicle to correct deceleration of the combination vehicle when the determined error is limited by the trailer brake saturation limit; classifying, by the processor, the adjustment of brake pedal position into one or more categories of a set of predefined correction categories, based on the adjustment of the brake pedal position and its corresponding effect on the determined error; when the classified adjustment of brake pedal position is classified into at least one category of the predefined correction categories that indicates a need for remapping of the brake pedal position deceleration map, generating, by the processor, an updated brake pedal position deceleration map configured to mitigate or remove a need to perform further adjustment of brake pedal position to achieve a desired braking effect; and utilizing, by the processor, the updated brake pedal position deceleration map in conjunction with brake pedal position information and vehicle motion information to (i) determine an updated target deceleration of the combination vehicle, and (ii) trigger actuation of the brakes of the combination vehicle responsive to the updated target deceleration. The first aspect of the disclosure may seek to address challenges with providing consistent brake pedal feel when driving a combination vehicle, by categorizing and estimating brake pedal position corrections made by a driver (with the categorization used to determine whether updating a brake pedal position deceleration map is appropriate), and then implementing the updated brake pedal position deceleration map when braking the combination vehicle. Establishment and use of updated brake pedal position deceleration map may be performed repeatedly while a vehicle is in motion, permitting incremental improvement in brake pedal feel over time. Adherence to trailer brake saturation limits also promotes safe operation.

Optionally in some examples, including in at least one preferred example, the set of predefined correction categories includes an impulsive correction category and a per-braking-cycle repeating correction category, and the at least one category of the predefined correction categories that indicates a need for remapping of the brake pedal position deceleration map includes the per-braking-cycle repeating correction category, and excludes the impulsive correction category. Exclusion of impulsive corrections avoids unnecessary remapping, while implementing remapping to address per-braking-cycle repeating corrections may permit brake pedal feel to be improved more quickly.

Optionally in some examples, including in at least one preferred example, the set of predefined correction categories further includes: a major correction category, a minor correction category, a smoother correction category, a hook-type correction category, an overshoot correction category, and an undershoot correction category; and wherein the at least one category of the predefined correction categories that indicates a need for remapping of the brake pedal position deceleration map comprises multiple predefined correction categories of the set of predefined correction categories.

Optionally in some examples, including in at least one preferred example, the method further comprises normalizing the brake pedal position information and the vehicle motion information to at least one of: combination vehicle speed, combination vehicle weight, and condition of a road surface on which the combination vehicle is traveling.

Optionally in some examples, including in at least one preferred example, the generating of the updated brake pedal position deceleration map comprises use of regression analysis.

Optionally in some examples, including in at least one preferred example, the classifying of the adjustment of brake pedal position into one or more categories, and the generating of the updated brake pedal position deceleration map, comprises use of periodogram spectrum estimates resulting from converting time domain data to frequency domain data.

Optionally in some examples, including in at least one preferred example, the periodogram spectrum estimates are found using Welch's overlapped segment averaging estimator.

Optionally, in some examples, including at least one preferred example, the periodic receiving, at the processor, of (i) brake pedal position information and (ii) vehicle motion information, comprises substantially continuously receiving, the (i) brake pedal position information and (ii) vehicle motion information, while the combination vehicle is in motion.

Optionally, in some examples, including at least one preferred example, the method further comprises indicating to the driver the generation of the updated brake pedal position deceleration map via a user interface of the towing vehicle.

Optionally, in some examples, including at least one preferred example, the method further comprises indicating to the driver the generation of the updated brake pedal position deceleration map via a user interface of the towing vehicle.

According to a second aspect of the disclosure, a combination vehicle is provided, the combination vehicle comprising: at least one trailer; a towing vehicle configured to pull the at least one trailer; a brake pedal position sensor associated with a brake pedal of the towing vehicle configured to be actuated by a driver of the towing vehicle to indicate an intended braking effect, the brake pedal position sensor configured to generate brake pedal position information; a processor; and a non-transitory computer-readable storage medium having stored instructions which, when executed by the processor, cause the processor to perform operations comprising: periodically receiving (i) the brake pedal position information, and (ii) vehicle motion information of the combination vehicle, as inputs to a brake pedal position deceleration map; utilizing said brake pedal position information, said vehicle motion information, and said brake pedal position deceleration map to determine a target deceleration of the combination vehicle, and responsive to the determined target deceleration, trigger actuation of brakes of the combination vehicle by transmitting a towing vehicle braking request to the towing vehicle and by transmitting a trailer braking request to the at least one trailer; determining an error in actual deceleration of the combination vehicle relative to the target deceleration, and responsive to the determined error, adjusting the trailer braking request to compensate for the determined error, but wherein compensation for the determined error is subject to being limited by a trailer brake saturation limit; determining an adjustment of brake pedal position by the driver of the towing vehicle to correct deceleration of the combination vehicle when the determined error is limited by the trailer brake saturation limit; classifying the adjustment of brake pedal position into one or more categories of a set of predefined correction categories, based on the adjustment of the brake pedal position and its corresponding effect on the determined error; when the classified adjustment of brake pedal position is classified into at least one category of the predefined correction categories that indicates a need for remapping of the brake pedal position deceleration map, generating an updated brake pedal position deceleration map configured to mitigate or remove a need to perform further adjustment of brake pedal position to achieve a desired braking effect; and utilizing the updated brake pedal position deceleration map in conjunction with brake pedal position information and vehicle motion information to (i) determine an updated target deceleration of the combination vehicle, and (ii) trigger actuation of the brakes of the combination vehicle responsive to the updated target deceleration. The second aspect of the disclosure may address the same issues and provide the same technical benefits as outlined above in connection with the first aspect.

Optionally in some examples, including in at least one preferred example, the set of predefined correction categories includes an impulsive correction category and a per-braking-cycle repeating correction category, and the at least one category of the predefined correction categories that indicates a need for remapping of the brake pedal position deceleration map includes the per-braking-cycle repeating correction category, and excludes the impulsive correction category.

Optionally in some examples, including in at least one preferred example, the set of predefined correction categories further includes: a major correction category, a minor correction category, a smoother correction category, a hook-type correction category, an overshoot correction category, and an undershoot correction category; and wherein the at least one category of the predefined correction categories that indicates a need for remapping of the brake pedal position deceleration map comprises multiple predefined correction categories of the set of predefined correction categories.

Optionally in some examples, including in at least one preferred example, the stored instructions which, when executed by the processor, cause the processor to further perform an operation comprising: normalizing the brake pedal position information and the vehicle motion information to at least one of: combination vehicle speed, combination vehicle weight, and condition of a road surface on which the combination vehicle is traveling. Such normalization may provide improved brake pedal feel tailored to specific conditions encountered by a particular combination vehicle.

Optionally in some examples, including in at least one preferred example, the generating of the updated brake pedal position deceleration map comprises use of regression analysis.

Optionally in some examples, including in at least one preferred example, the classifying of the adjustment of brake pedal position into one or more categories, and the generating of the updated brake pedal position deceleration map, comprises use of periodogram spectrum estimates resulting from converting time domain data to frequency domain data.

Optionally in some examples, including in at least one preferred example, the stored instructions which, when executed by the processor, cause the processor to further perform an operation comprising: indicating to the driver the generation of the updated brake pedal position deceleration map via a user interface of the towing vehicle.

According to a third aspect of the disclosure, a non-transitory computer-readable storage medium stored within a towing vehicle is provided, the non-transitory computer-readable storage medium having stored instructions which, when executed by a processor, cause the processor to perform operations comprising: periodically receiving, at the processor, (i) brake pedal position information for a towing vehicle brake pedal actuated by a driver to indicate an intended braking effect, and (ii) vehicle motion information of the combination vehicle, as inputs to a brake pedal position deceleration map; utilizing, by the processor, said brake pedal position information, said vehicle motion information, and said brake pedal position deceleration map to determine a target deceleration of the combination vehicle, and responsive to the determined target deceleration, trigger actuation of brakes of the combination vehicle by transmitting a towing vehicle braking request to the towing vehicle and by transmitting a trailer braking request to the at least one trailer; determining, by the processor, an error in actual deceleration of the combination vehicle relative to the target deceleration, and responsive to the determined error, adjusting the trailer braking request to compensate for the determined error, but wherein compensation for the determined error is subject to being limited by a trailer brake saturation limit; determining, by the processor, an adjustment of brake pedal position by the driver of the towing vehicle to correct deceleration of the combination vehicle when the determined error is limited by the trailer brake saturation limit; classifying, by the processor, the adjustment of brake pedal position into one or more categories of a set of predefined correction categories, based on the adjustment of the brake pedal position and its corresponding effect on the determined error; when the classified adjustment of brake pedal position is classified into at least one category of the predefined correction categories that indicates a need for remapping of the brake pedal position deceleration map, generating, by the processor, an updated brake pedal position deceleration map configured to mitigate or remove a need to perform further adjustment of brake pedal position to achieve a desired braking effect; and utilizing, by the processor, the updated brake pedal position deceleration map in conjunction with brake pedal position information and vehicle motion information to (i) determine an updated target deceleration of the combination vehicle, and (ii) trigger actuation of the brakes of the combination vehicle responsive to the updated target deceleration. The third aspect of the disclosure may address the same issues and provide the same technical benefits as outlined above in connection with the first aspect.

Optionally in some examples, including in at least one preferred example, the set of predefined correction categories includes an impulsive correction category and a per-braking-cycle repeating correction category, and the at least one category of the predefined correction categories that indicates a need for remapping of the brake pedal position deceleration map includes the per-braking-cycle repeating correction category, and excludes the impulsive correction category.

Optionally in some examples, including in at least one preferred example, the set of predefined correction categories further includes: a major correction category, a minor correction category, a smoother correction category, a hook-type correction category, an overshoot correction category, and an undershoot correction category; and wherein the at least one category of the predefined correction categories that indicates a need for remapping of the brake pedal position deceleration map comprises multiple predefined correction categories of the set of predefined correction categories.

Optionally in some examples, including in at least one preferred example, the stored instructions which, when executed by the processor, cause the processor to further perform an operation comprising: normalizing the brake pedal position information and the vehicle motion information to at least one of: combination vehicle speed, combination vehicle weight, and condition of a road surface on which the combination vehicle is traveling.

Optionally in some examples, including in at least one preferred example, the classifying of the adjustment of brake pedal position into one or more categories, and the generating of the updated brake pedal position deceleration map, comprises use of periodogram spectrum estimates resulting from converting time domain data to frequency domain data.

Optionally in some examples, including in at least one preferred example, the stored instructions which, when executed by the processor, cause the processor to further perform an operation comprising: indicating to the driver the generation of the updated brake pedal position deceleration map via a user interface of the towing vehicle.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

DETAILED DESCRIPTION

Examples are described in more detail below with reference to the appended drawings.

Aspects of the disclosure relating to a method for handling braking of a combination vehicle, involving vehicle-specific dynamic updating and implementation of a brake pedal position deceleration map. Rather than employing a fixed brake pedal position deceleration map, such map may be updated while a vehicle is in motion to address non-attainment of target deceleration (i.e., an error in actual deceleration relative to a target deceleration) when the error would be limited by a trailer brake saturation limit, by classifying the adjustment of brake pedal position into one or more of a set of predefined correction categories, and when the classified adjustment of brake pedal position corresponds to a need for remapping of the brake pedal position deceleration map, an updated brake pedal position deceleration map (configured to mitigate or remove a need to perform further adjustment of brake pedal position to achieve a desired braking effect) is generated by a processor, and the updated brake pedal position deceleration map is utilized (with brake pedal position information and vehicle motion information) to determine an updated target deceleration of the combination vehicle, and actuation of brakes of the combination vehicle are triggered responsive to the updated target deceleration.

Figure 1:
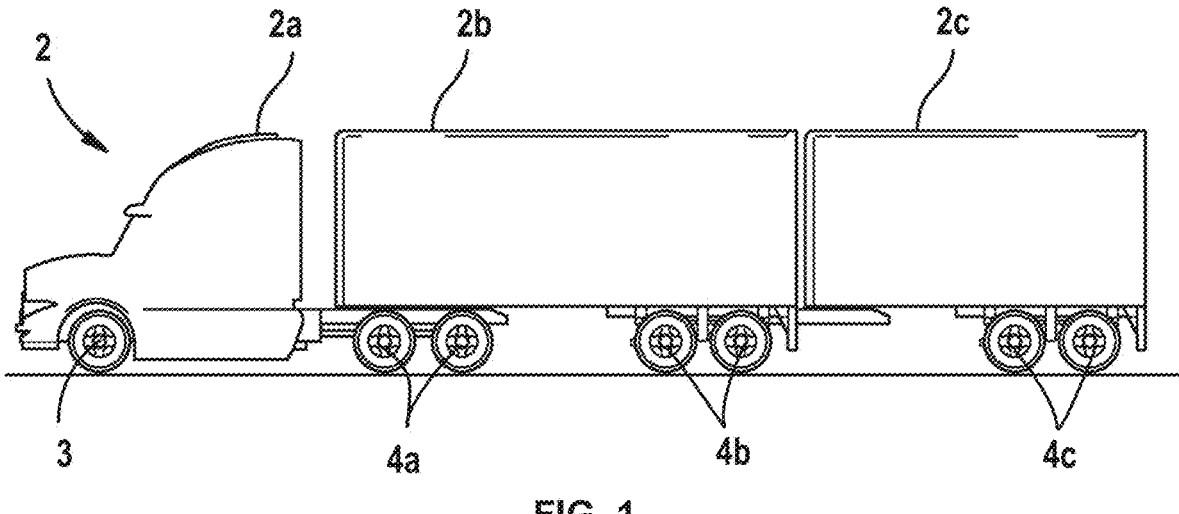
FIG. 1 is an exemplary side elevational view of a combination vehicle including a towing vehicle arranged to two first and second trailers.

To provide context, a combination vehicle will be introduced, and followed by details of the disclosed aspects. FIG. 1 is an exemplary side elevational view of a combination vehicle 2 including a towing vehicle (e.g., a tractor unit, also known as a truck unit or prime mover) 2a arranged to tow a first trailer 2b and a second trailer 2c, wherein each of the first and second trailers 2b, 2c may embody a semi-trailer lacking a front axle. As shown, the towing vehicle includes a steerable front axle 3 and two rear axles 4a, while the first trailer 2b includes two rear trailer axles 4b, and the second trailer 2c includes two rear trailer axles 4c. Each axle 3, 4a-4c of the combination vehicle 2 is equipped with a brake. Each axle 3, 4a, 4b, 4c (or wheel end thereof) may have a dedicated brake actuator. As is known in the art, the towing vehicle 2a includes an electronic control unit (ECU) having at least one processor (10 in FIG. 2) configured to control braking of the combination vehicle 2 as part of an electro-pneumatic braking system including an electronic pressure modulator (EPM) that can deliver controlled amounts of compressed air to each axle 3, 4a, 4b, 4c for brake actuation.

Figure 2:
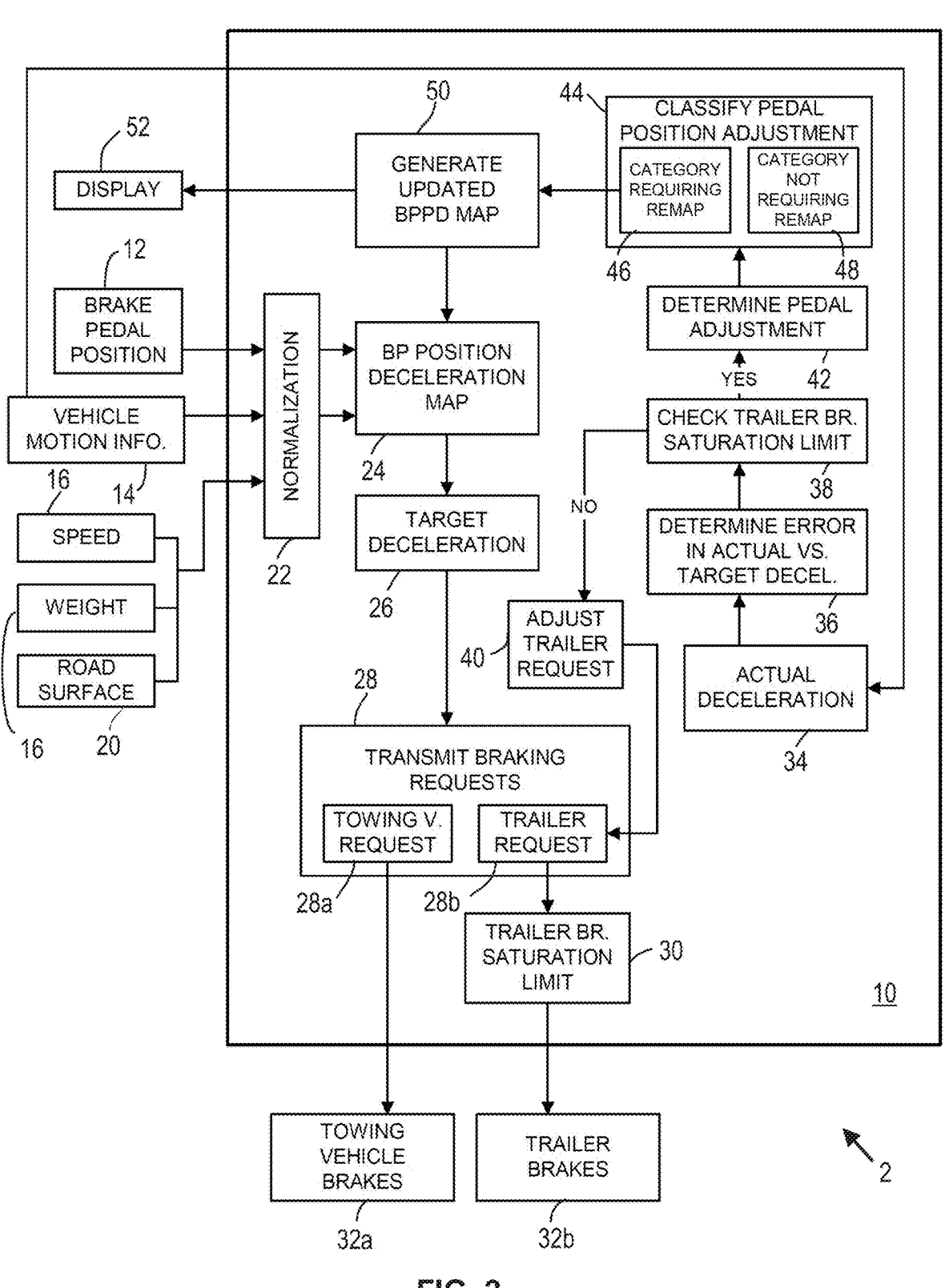
FIG. 2 is a diagrammatic layout of components for performing a method for handling braking of a combination vehicle including a towing vehicle and at least one trailer, configured to generate and utilize an updated brake pedal position deceleration map, according to an example.

FIG. 2 is a diagrammatic layout of components for performing a method for handling braking of a combination vehicle 2 including a towing vehicle (2a in FIG. 1) and at least one trailer (2b, 2c in FIG. 1), configured to generate and utilize an updated brake pedal position deceleration map, according to an example. A brake pedal position sensor 12 and various vehicle motion sensors 14 (e.g., acceleration sensors, speed sensors, position sensors, suspension travel sensors, etc.) are associated with of the combination vehicle 2 (more specifically, the towing vehicle thereof). A processor 10 (which may be part of an ECU of the combination vehicle 2) includes a brake pedal position deceleration map 24, which may embody a lookup table or similar relational device that provides target deceleration values as a function of brake pedal position and vehicle motion. Optionally, information received from the brake pedal position sensor 12 and various vehicle motion sensors 14 may be normalized (e.g., by a normalization block or module 22) based on various parameters such as combination vehicle speed, combination vehicle weight/load, and condition of a road surface on which the combination vehicle 2 is traveling, wherein such information may be supplied by speed sensors 16, weight/load sensors 16, and road condition sensors 20 to the normalization module 22, such that normalized brake pedal position information and normalized vehicle motion information may be supplied to the brake pedal position deceleration map 12. Utilizing the brake pedal position information and vehicle motion information (optionally normalized), a target deceleration value is determined at block or module 26, and such value is conveyed to a braking request transmission block or module 28. Using the target deceleration value, a towing vehicle braking request 28a is generated, and transmitted to one or more towing vehicle brake actuators 32a. Additionally using the target deceleration value, a trailer braking request 28b is generated, but its value is compared to a trailer brake saturation limit at saturation limit check block or module 30. If the trailer braking request 28b is less than the trailer brake saturation limit, then the trailer braking request 28b is transmitted in unmodified form to one or more trailer brake actuators 32b; otherwise, the trailer braking request 28b is modified to be within the trailer brake saturation limit, and a modified (e.g., reduced) trailer braking request 28b is transmitted to the one or more trailer brake actuators 32b.

With continued reference to FIG. 2, upon actuation of the towing vehicle brakes 32a and the trailer brakes 32b, motion of the combination vehicle 2 is detected by the vehicle motion sensors 14 and information concerning actual deceleration of the combination vehicle 2 is provided to the processor 10 at block or module 34. The actual deceleration information (from block or module 34) is compared to the target deceleration information (previously determined at block or module 26) to determine (if any) an error between the actual deceleration and target deceleration at comparison block or module 36. If no error is determined, then no corrective action is necessary, since the braking requests previously issued to the towing vehicle brakes 32a and the trailer brakes 32 were sufficient to attain the target deceleration. However, if an error is determined between actual deceleration and target deceleration, then two potential courses of action can be taken. A first potential course of action would be to determine an adjusted trailer braking request that would compensate for the determined error (e.g., at block or module 36), but its implementation would depend on whether an adjusted trailer braking request to compensate for the determined error would be limited by the trailer brake saturation limit. Accordingly, an adjusted trailer braking request is compared to the trailer brake saturation limit at block or module 36. If the adjusted trailer braking request would not exceed the trailer brake saturation limit, then the adjusted trailer braking request 40 is communicated to the braking request transmission block or module 28 and ultimately transmitted to the trailer brakes 32b. If, however, the adjusted trailer braking request would exceed the trailer brake saturation limit based on the outcome of checking the trailer brake saturation limit at block or module 38, then an adjustment of brake pedal position (i.e., to correct deceleration of the combination vehicle 2) is determined at block or module 42.

The adjustment of brake pedal position determined at block or module 42 is then classified into one or more categories of a set of predetermined correction categories, based on the adjustment of the brake pedal position and its corresponding effect on the determined error, at block or module 44. Among the predetermined correction categories, some predetermined correction categories (taken alone or in combination) 46 may indicate a need for remapping of a brake pedal position deceleration map, while other predetermined categories 48 may not require remapping of the brake pedal position deceleration map. In one example, the set of predefined correction categories may include an impulsive correction category and a per-braking-cycle repeating correction category, wherein the former may not indicate a need for remapping of a brake pedal position deceleration map, and the latter may indicate a need for remapping. Various other predefined correction categories may be provided, such as: a major correction category, a minor correction category, a smoother correction category, a hook-type correction category, an overshoot correction category, and an undershoot correction category. Some categories may include quantitative thresholds (e.g., to categorize as major or minor correction depending on error magnitude. In one example, multiple predefined correction categories may indicate a need for remapping of a brake pedal position deceleration map. In one example, sequential or nested logic may be employed, such that a primary classification step (e.g., into repeating or impulsive categories) be performed first, and a secondary classification step (e.g., into other categories, such as a major correction category, a minor correction category, a smoother correction category, a hook-type correction category, an overshoot correction category, and an undershoot correction category) may be performed thereafter based on an outcome of a primary classification step, such that identification of an impulsive correction as a primary classification may eliminate need for secondary classification. For example, if a repeating error is determined to also be major (e.g., magnitude on a quantitative basis), then remapping may be needed, but a repeating error that is minor may not necessarily give rise to a need for remapping.

If an adjustment of brake pedal position (determined at block or module 42) is classified into one or more categories 46 requiring remapping (with such classification performed at block or module 44), then an updated brake pedal position deceleration map is generated at block or module 40. This updated brake pedal position deceleration map then replaces the prior brake pedal position deceleration map, and is then utilized by the processor 10 (at block or module 24) in conjunction with brake pedal position information and vehicle motion information to (i) determine an updated target deceleration of the combination vehicle, and (ii) trigger actuation of the brakes of the combination vehicle responsive to the updated target deceleration. Optionally, a user (e.g., driver of the combination vehicle 2) may be alerted that the brake pedal position deceleration map was updated via a user interface (e.g., display) 52, which may be located in the combination vehicle 2.

In one example, the generating of the updated brake pedal position deceleration map (at block or module 50) may comprise use of regression analysis. A regression based error estimator may use time data (optionally normalized) and then use the time data to estimate the error magnitude. Such analysis may be performed on time based data and frequency domain data using Pwelch conversion strategies. In one example, the classification analysis (at block or module 44) may also be performed on time based data and frequency domain data using Pwelch conversion strategies. In one example, the classifying of the adjustment of brake pedal position into one or more categories, and the generating of the updated brake pedal position deceleration map, comprises use of periodogram spectrum estimates resulting from converting time domain data to frequency domain data.

In one example, a Recurrent Neural Network (RNN) using time series data may be employed for training a trained machine learning model to classify the adjustment of brake pedal position into one or more categories, and/or to generate an updated brake pedal position deceleration map.

In one example, a RNN is trained based on a plurality of training combination vehicles having differing braking characteristics. Sensor data can be collected for combination vehicles with various trailers while the combination vehicle is driven and/or tested. The sensor data may then be compared using a sensitivity analysis to determine which features should be input to a machine learning algorithm that outputs the RNN. For example, a sensitivity analysis can execute algorithms (such as a one-at a time test, a derivative-based local method, regression analysis, variance-based method, screening, scatter plots, etc.) to identify how a given input/variable affects combination vehicle deceleration as a partial function of brake pedal position deceleration. Outputs of the sensitivity analysis, as well as the combined training data, can then be used by the machine learning algorithm to output the RNN. For example, test data associated with the factors identified by the sensitivity analysis can be input into Python, MatLab®, or other development software configured to construct an RNN based on factor-specific data. Depending on the specific scenario, RNN construction can be adjusted by selecting from optimization methods including (but not limited to) the least-squares method, the Levenberg-Marquardt algorithm, the gradient descent method, or the Gauss-Newton method. In one example, training of the machine learning model may utilize any of the following methods: Linear Regression, Ridge Regression, Neural Network Regression, Lasso Regression, Decision Tree Regression, Random Forest, KNN Model, Support Vector Machines (SVM), Gaussian Regression, and Polynomial Regression.

The trained machine learning model can provide a predicted brake pedal position deceleration map for a given combination vehicle subject to specified conditions based on current and past conditions. Once the machine learning model is trained, it can be loaded into the memory of a computer system and then executed by a processor of that computer system. In the example shown in FIG. 2, the classification module or block 44 and the updated brake pedal position deceleration map generation module or block 50 may utilize a trained machine learning model that may be deployed in or by processor 10, which may be on board the combination vehicle 2, or may reside in in a server-based controller that receives necessary feature data via a network link (e.g., wireless or wired) and communicates with the combination vehicle.

Figure 3:
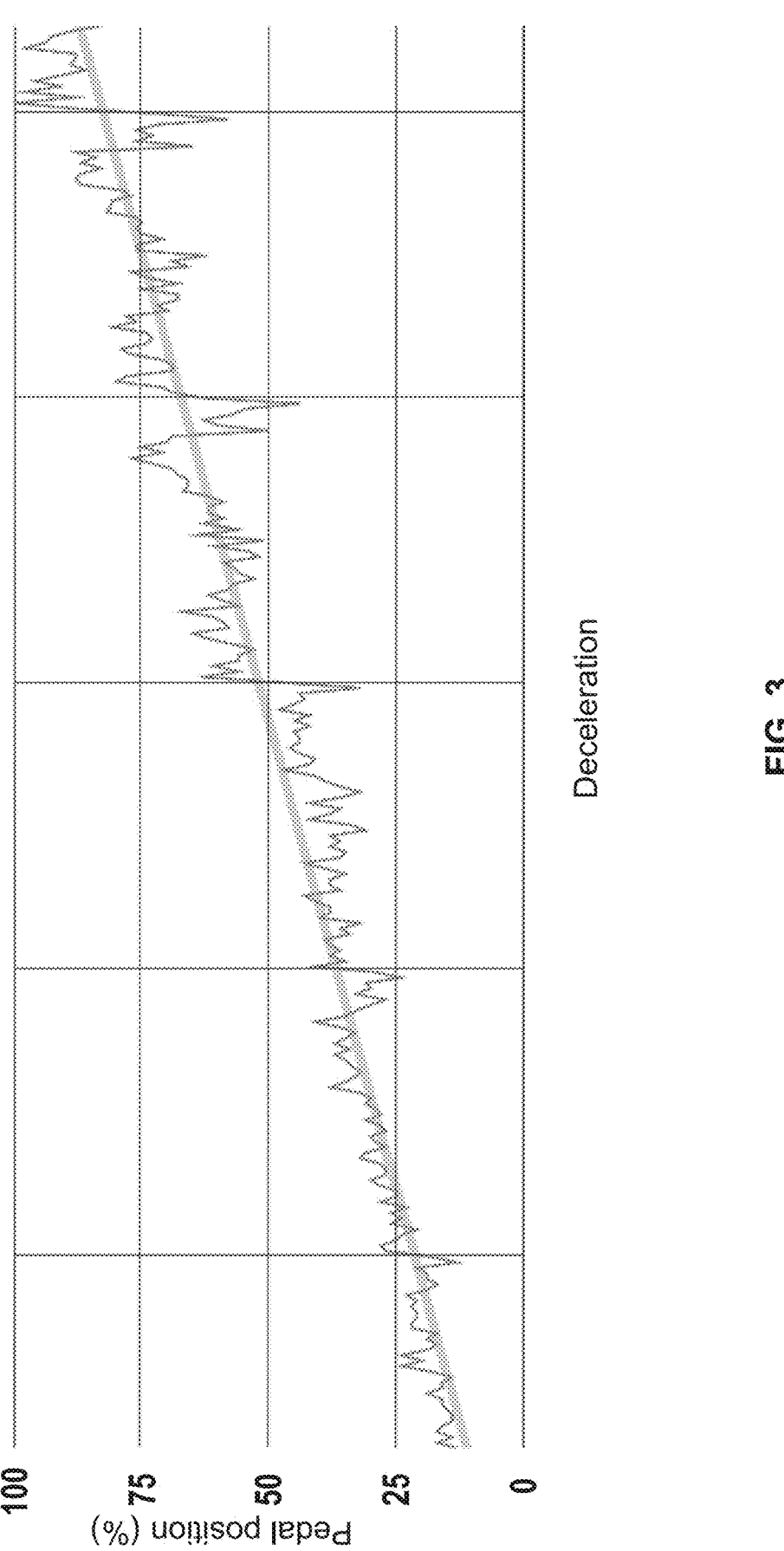
FIG. 3 is a plot of brake pedal position versus deceleration for a combination vehicle.

FIG. 3 is a plot of brake pedal position versus deceleration for a combination vehicle including a towing vehicle and at least one trailer, with a superimposed linear regression line. As shown, the magnitude of variation in brake pedal position is relatively small at lower deceleration values, and the magnitude of variation in brake pedal position increases with increasing deceleration values.

Figures 4A, 4B:
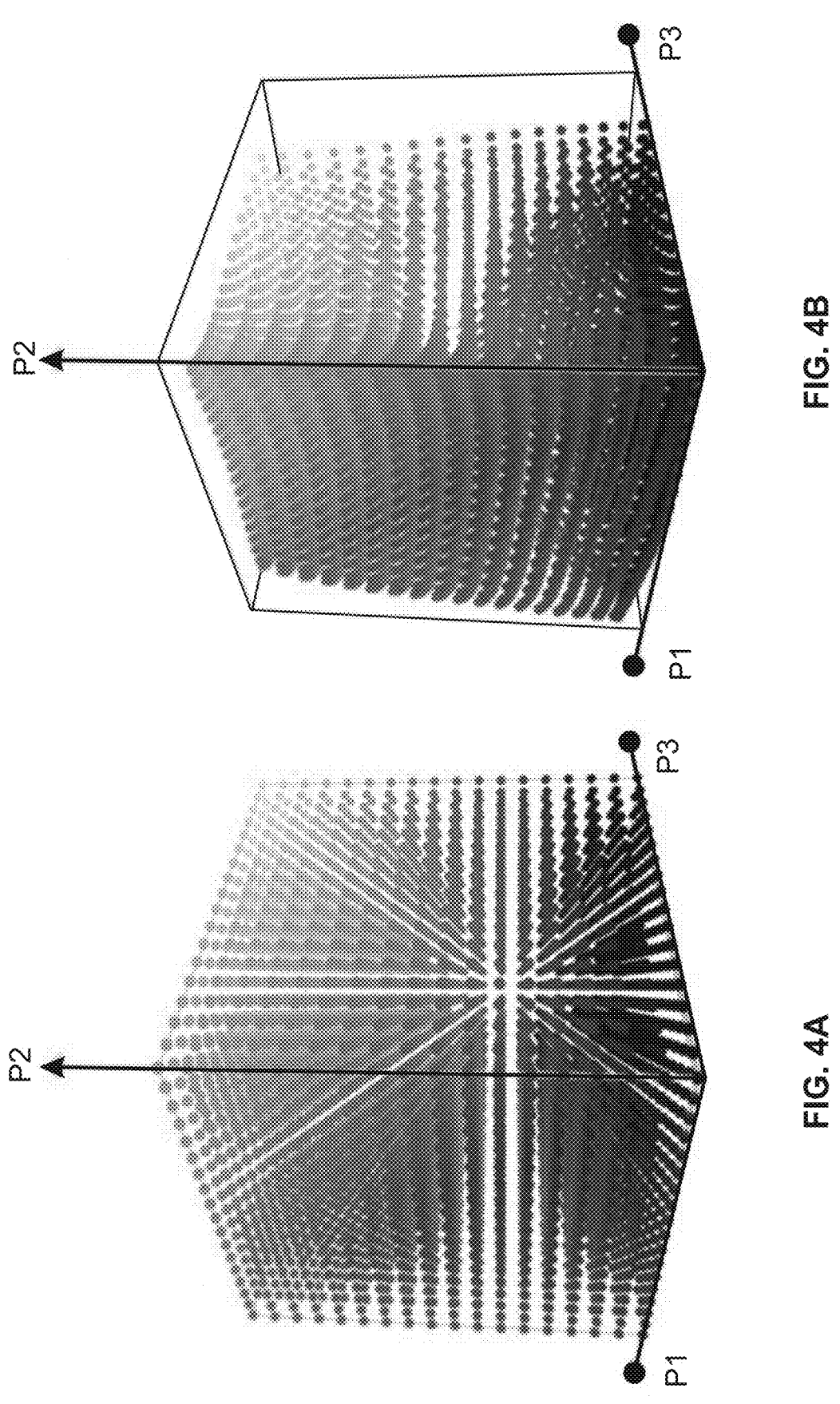
FIG. 4A is a plot of a three-dimensional brake pedal position map for a combination vehicle (with axes P1, P2, and P3 representing Parameter 1, Parameter 2, and Parameter 3, respectively, optionally corresponding to brake pedal position, deceleration, and load) prior to adaptive learning and remapping.
FIG. 4B is a plot of a three-dimensional brake pedal position map (with axes P1, P2, and P3 representing Parameter 1, Parameter 2, and Parameter 3, respectively) obtained from the map of FIG. 4A, following modeling representing a method for handling brake factor as disclosed herein according to an example.

FIG. 4A is a plot of a three-dimensional brake pedal position map for a combination vehicle (with axes representing Parameter 1, Parameter 2, and Parameter 3, optionally corresponding to brake pedal position, deceleration, and load prior to adaptive learning and remapping. FIG. 4B is a plot of a three-dimensional brake pedal position map (with axes P1, P2, and P3 representing Parameter 1, Parameter 2, and Parameter 3, respectively) obtained by remapping the map of FIG. 4A, following modeling representing a method for handling brake factor as disclosed herein according to an example. In one example, the remapping of FIG. 4B is obtained through use of a trained machine learning model such as an RNN.

Figure 5:
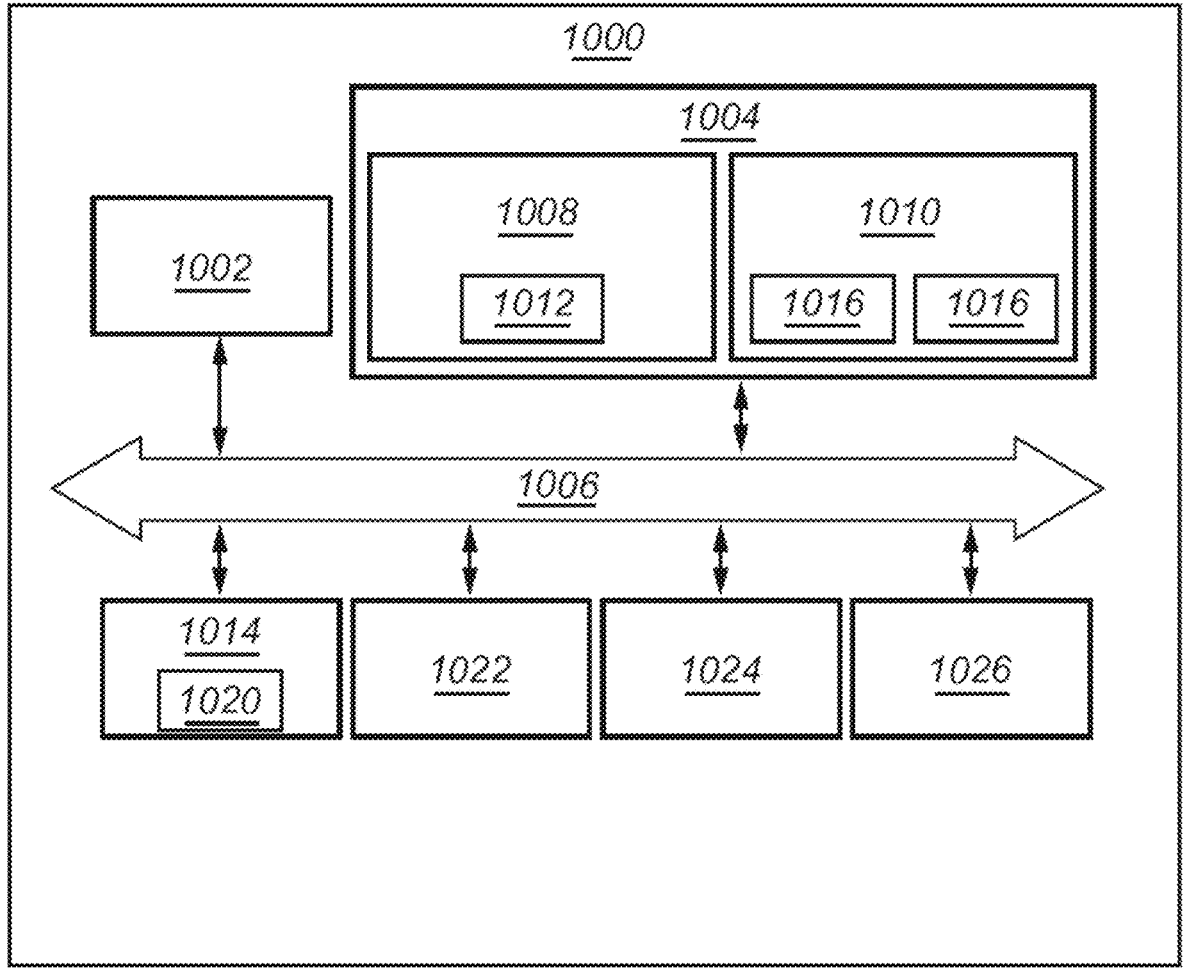
FIG. 5 illustrates an example computer system.

FIG. 5 is a schematic diagram of a computer system 1000 for implementing examples disclosed herein. The computer system 1000 is adapted to execute instructions from a computer-readable medium to perform these and/or any of the functions or processing described herein. The computer system 1000 may be connected (e.g., networked) to other machines in a LAN (Local Area Network), LIN (Local Interconnect Network), automotive network communication protocol (e.g., FlexRay), an intranet, an extranet, or the Internet. While only a single device is illustrated, the computer system 1000 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 1000 may comprise at least one computing device or electronic device capable of including firmware, hardware, and/or executing software instructions to implement the functionality described herein. The computer system 1000 may include processing circuitry 1002 (e.g., processing circuitry including one or more processor devices or control units), a memory 1004, and a system bus 1006. The computer system 1000 may include at least one computing device having the processing circuitry 1002. The system bus 1006 provides an interface for system components including, but not limited to, the memory 1004 and the processing circuitry 1002. The processing circuitry 1002 may include any number of hardware components for conducting data or indication processing or for executing computer code stored in memory 1004. The processing circuitry 1002 may, for example, include a general-purpose processor, an application specific processor, a Digital indication Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 1002 may further include computer executable code that controls operation of the programmable device.

The system bus 1006 may be any of several types of bus structures that may further interconnect to a memory bus (with or without a memory controller), a peripheral bus, and/or a local bus using any of a variety of bus architectures.

The memory 1004 may be one or more devices for storing data and/or computer code for completing or facilitating methods described herein. The memory 1004 may include database components, object code components, script components, or other types of information structure for supporting the various activities herein. Any distributed or local memory device may be utilized with the systems and methods of this description. The memory 1004 may be communicably connected to the processing circuitry 1002 (e.g., via a circuit or any other wired, wireless, or network connection) and may include computer code for executing one or more processes described herein. The memory 1004 may include non-volatile memory 1008 (e.g., read-only memory (ROM), erasable programmable read-only memory (EPROM), electrically erasable programmable read-only memory (EEPROM), etc.), and volatile memory 1010 (e.g., random-access memory (RAM)), or any other medium which can be used to carry or store desired program code in the form of machine-executable instructions or data structures and which can be accessed by a computer or other machine with processing circuitry 1002. A basic input/output system (BIOS) 1012 may be stored in the non-volatile memory 1008 and can include the basic routines that help to transfer information between elements within the computer system 1000.

The computer system 1000 may further include or be coupled to a non-transitory computer-readable storage medium such as the storage device 1014, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 1014 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 1014 and/or in the volatile memory 1010, which may include an operating system 1016 and/or one or more program modules 1018. All or a portion of the examples disclosed herein may be implemented as a computer program 1020 stored on a transitory or non-transitory computer-usable or computer-readable storage medium (e.g., single medium or multiple media), such as the storage device 1014, which includes complex programming instructions (e.g., complex computer-readable program code) to cause the processing circuitry 1002 to carry out actions described herein. Thus, the computer-readable program code of the computer program 1020 can comprise software instructions for implementing the functionality of the examples described herein when executed by the processing circuitry 1002. In some examples, the storage device 1014 may be a computer program product (e.g., readable storage medium) storing the computer program 1020 thereon, where at least a portion of a computer program 1020 may be loadable (e.g., into a processor) for implementing the functionality of the examples described herein when executed by the processing circuitry 1002. The processing circuitry 1002 may serve as a controller or control system for the computer system 1000 that is to implement the functionality described herein.

The computer system 1000 may include an input device interface 1022 configured to receive input and selections to be communicated to the computer system 1000 when executing instructions, such as from a keyboard, mouse, touch-sensitive surface, etc. Such input devices may be connected to the processing circuitry 1002 through the input device interface 1022 coupled to the system bus 1006 but can be connected through other interfaces, such as a parallel port, an Institute of Electrical and Electronic Engineers (IEEE) 1394 serial port, a Universal Serial Bus (USB) port, an IR interface, and the like. The computer system 1000 may include an output device interface 1024 configured to forward output, such as to a display, a video display unit (e.g., a liquid crystal display (LCD) or a cathode ray tube (CRT)). The computer system 1000 may include a communications interface 1026 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Example 1: A method for handling braking of a combination vehicle including a towing vehicle and at least one trailer, the method comprising: periodically receiving, at a processor, (i) brake pedal position information for a towing vehicle brake pedal actuated by a driver to indicate an intended braking effect, and (ii) vehicle motion information of the combination vehicle, as inputs to a brake pedal position deceleration map; utilizing, by the processor, said brake pedal position information, said vehicle motion information, and said brake pedal position deceleration map to determine a target deceleration of the combination vehicle, and responsive to the determined target deceleration, trigger actuation of brakes of the combination vehicle by transmitting a towing vehicle braking request to the towing vehicle and by transmitting a trailer braking request to the at least one trailer; determining, by the processor, an error in actual deceleration of the combination vehicle relative to the target deceleration, and responsive to the determined error, adjusting the trailer braking request to compensate for the determined error, but wherein compensation for the determined error is subject to being limited by a trailer brake saturation limit; determining, by the processor, an adjustment of brake pedal position by the driver of the towing vehicle to correct deceleration of the combination vehicle when the determined error is limited by the trailer brake saturation limit; classifying, by the processor, the adjustment of brake pedal position into one or more categories of a set of predefined correction categories, based on the adjustment of the brake pedal position and its corresponding effect on the determined error; when the classified adjustment of brake pedal position is classified into at least one category of the predefined correction categories that indicates a need for remapping of the brake pedal position deceleration map, generating, by the processor, an updated brake pedal position deceleration map configured to mitigate or remove a need to perform further adjustment of brake pedal position to achieve a desired braking effect; and utilizing, by the processor, the updated brake pedal position deceleration map in conjunction with brake pedal position information and vehicle motion information to (i) determine an updated target deceleration of the combination vehicle, and (ii) trigger actuation of the brakes of the combination vehicle responsive to the updated target deceleration.

Example 2: The method of Example 1, wherein the set of predefined correction categories includes an impulsive correction category and a per-braking-cycle repeating correction category, and the at least one category of the predefined correction categories that indicates a need for remapping of the brake pedal position deceleration map includes the per-braking-cycle repeating correction category, and excludes the impulsive correction category.

Example 3: The method of Example 2, the set of predefined correction categories further includes: a major correction category, a minor correction category, a smoother correction category, a hook-type correction category, an overshoot correction category, and an undershoot correction category; and wherein the at least one category of the predefined correction categories that indicates a need for remapping of the brake pedal position deceleration map comprises multiple predefined correction categories of the set of predefined correction categories.

Example 4: The method of any one of Examples 1 to 3, further comprising normalizing the brake pedal position information and the vehicle motion information to at least one of: combination vehicle speed, combination vehicle weight, and condition of a road surface on which the combination vehicle is traveling.

Example 5: The method of any one of Examples 1 to 4, wherein the generating of the updated brake pedal position deceleration map comprises use of regression analysis.

Example 6: The method of any one of Examples 1 to 4, wherein the classifying of the adjustment of brake pedal position into one or more categories, and the generating of the updated brake pedal position deceleration map, comprises use of periodogram spectrum estimates resulting from converting time domain data to frequency domain data.

Example 7: The method of Example 6, wherein the periodogram spectrum estimates are found using Welch's overlapped segment averaging estimator.

Example 8: The method of any one of Examples 1 to 6, wherein the periodic receiving, at the processor, of (i) brake pedal position information and (ii) vehicle motion information, comprises substantially continuously receiving, the (i) brake pedal position information and (ii) vehicle motion information, while the combination vehicle is in motion.

Example 9: The method of any one of Examples 1 to 8, further comprising indicating to the driver the generation of the updated brake pedal position deceleration map via a user interface of the towing vehicle.

Example 10: A combination vehicle comprising: at least one trailer; a towing vehicle configured to pull the at least one trailer; a brake pedal position sensor associated with a brake pedal of the towing vehicle configured to be actuated by a driver of the towing vehicle to indicate an intended braking effect, the brake pedal position sensor configured to generate brake pedal position information; a processor; and a non-transitory computer-readable storage medium having stored instructions which, when executed by the processor, cause the processor to perform operations comprising: periodically receiving (i) the brake pedal position information, and (ii) vehicle motion information of the combination vehicle, as inputs to a brake pedal position deceleration map; utilizing said brake pedal position information, said vehicle motion information, and said brake pedal position deceleration map to determine a target deceleration of the combination vehicle, and responsive to the determined target deceleration, trigger actuation of brakes of the combination vehicle by transmitting a towing vehicle braking request to the towing vehicle and by transmitting a trailer braking request to the at least one trailer; determining an error in actual deceleration of the combination vehicle relative to the target deceleration, and responsive to the determined error, adjusting the trailer braking request to compensate for the determined error, but wherein compensation for the determined error is subject to being limited by a trailer brake saturation limit; determining an adjustment of brake pedal position by the driver of the towing vehicle to correct deceleration of the combination vehicle when the determined error is limited by the trailer brake saturation limit; classifying the adjustment of brake pedal position into one or more categories of a set of predefined correction categories, based on the adjustment of the brake pedal position and its corresponding effect on the determined error; when the classified adjustment of brake pedal position is classified into at least one category of the predefined correction categories that indicates a need for remapping of the brake pedal position deceleration map, generating an updated brake pedal position deceleration map configured to mitigate or remove a need to perform further adjustment of brake pedal position to achieve a desired braking effect; and utilizing the updated brake pedal position deceleration map in conjunction with brake pedal position information and vehicle motion information to (i) determine an updated target deceleration of the combination vehicle, and (ii) trigger actuation of the brakes of the combination vehicle responsive to the updated target deceleration.

Example 11: The combination vehicle of Example 10, wherein the set of predefined correction categories includes an impulsive correction category and a per-braking-cycle repeating correction category, and the at least one category of the predefined correction categories that indicates a need for remapping of the brake pedal position deceleration map includes the per-braking-cycle repeating correction category, and excludes the impulsive correction category.

Example 12: The combination vehicle of Example 10, wherein: the set of predefined correction categories further includes: a major correction category, a minor correction category, a smoother correction category, a hook-type correction category, an overshoot correction category, and an undershoot correction category; and wherein the at least one category of the predefined correction categories that indicates a need for remapping of the brake pedal position deceleration map comprises multiple predefined correction categories of the set of predefined correction categories.

Example 13: The combination vehicle of any one of Examples 10 to 12, wherein the stored instructions which, when executed by the processor, cause the processor to further perform an operation comprising: normalizing the brake pedal position information and the vehicle motion information to at least one of: combination vehicle speed, combination vehicle weight, and condition of a road surface on which the combination vehicle is traveling.

Example 14: The combination vehicle of any one of Examples 10 to 13, wherein the generating of the updated brake pedal position deceleration map comprises use of regression analysis.

Example 15: The combination vehicle of any one of Examples 10 to 14, wherein the classifying of the adjustment of brake pedal position into one or more categories, and the generating of the updated brake pedal position deceleration map, comprises use of periodogram spectrum estimates resulting from converting time domain data to frequency domain data.

Example 16: A non-transitory computer-readable storage medium stored within a towing vehicle, the non-transitory computer-readable storage medium having stored instructions which, when executed by a processor, cause the processor to perform operations comprising: periodically receiving, at the processor, (i) brake pedal position information for a towing vehicle brake pedal actuated by a driver to indicate an intended braking effect, and (ii) vehicle motion information of the combination vehicle, as inputs to a brake pedal position deceleration map; utilizing, by the processor, said brake pedal position information, said vehicle motion information, and said brake pedal position deceleration map to determine a target deceleration of the combination vehicle, and responsive to the determined target deceleration, trigger actuation of brakes of the combination vehicle by transmitting a towing vehicle braking request to the towing vehicle and by transmitting a trailer braking request to the at least one trailer; determining, by the processor, an error in actual deceleration of the combination vehicle relative to the target deceleration, and responsive to the determined error, adjusting the trailer braking request to compensate for the determined error, but wherein compensation for the determined error is subject to being limited by a trailer brake saturation limit; determining, by the processor, an adjustment of brake pedal position by the driver of the towing vehicle to correct deceleration of the combination vehicle when the determined error is limited by the trailer brake saturation limit; classifying, by the processor, the adjustment of brake pedal position into one or more categories of a set of predefined correction categories, based on the adjustment of the brake pedal position and its corresponding effect on the determined error; when the classified adjustment of brake pedal position is classified into at least one category of the predefined correction categories that indicates a need for remapping of the brake pedal position deceleration map, generating, by the processor, an updated brake pedal position deceleration map configured to mitigate or remove a need to perform further adjustment of brake pedal position to achieve a desired braking effect; and utilizing, by the processor, the updated brake pedal position deceleration map in conjunction with brake pedal position information and vehicle motion information to (i) determine an updated target deceleration of the combination vehicle, and (ii) trigger actuation of the brakes of the combination vehicle responsive to the updated target deceleration.

Example 17: The non-transitory computer-readable storage medium stored within a towing vehicle of Example 16, wherein the set of predefined correction categories includes an impulsive correction category and a per-braking-cycle repeating correction category, and the at least one category of the predefined correction categories that indicates a need for remapping of the brake pedal position deceleration map includes the per-braking-cycle repeating correction category, and excludes the impulsive correction category.

Example 18: The non-transitory computer-readable storage medium stored within a towing vehicle of Example 16, wherein: the set of predefined correction categories further includes: a major correction category, a minor correction category, a smoother correction category, a hook-type correction category, an overshoot correction category, and an undershoot correction category; and wherein the at least one category of the predefined correction categories that indicates a need for remapping of the brake pedal position deceleration map comprises multiple predefined correction categories of the set of predefined correction categories.

Example 19: The non-transitory computer-readable storage medium stored within a towing vehicle of any one of Examples 16 to 18, wherein the stored instructions which, when executed by the processor, cause the processor to further perform an operation comprising: normalizing the brake pedal position information and the vehicle motion information to at least one of: combination vehicle speed, combination vehicle weight, and condition of a road surface on which the combination vehicle is traveling.

Example 20: The non-transitory computer-readable storage medium stored within a towing vehicle of any one of Examples 16 to 19, wherein the classifying of the adjustment of brake pedal position into one or more categories, and the generating of the updated brake pedal position deceleration map, comprises use of periodogram spectrum estimates resulting from converting time domain data to frequency domain data.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A method for handling braking of a combination vehicle including a towing vehicle and at least one trailer, the method comprising:

periodically receiving, at a processor, (i) brake pedal position information for a towing vehicle brake pedal actuated by a driver to indicate an intended braking effect, and (ii) vehicle motion information of the combination vehicle, as inputs to a brake pedal position deceleration map;

utilizing, by the processor, said brake pedal position information, said vehicle motion information, and said brake pedal position deceleration map to determine a target deceleration of the combination vehicle, and responsive to the determined target deceleration, trigger actuation of brakes of the combination vehicle by transmitting a towing vehicle braking request to the towing vehicle and by transmitting a trailer braking request to the at least one trailer;

determining, by the processor, an error in actual deceleration of the combination vehicle relative to the target deceleration, and responsive to the determined error, adjusting the trailer braking request to compensate for the determined error, but wherein compensation for the determined error is subject to being limited by a trailer brake saturation limit;

determining, by the processor, an adjustment of brake pedal position by the driver of the towing vehicle to correct deceleration of the combination vehicle when the determined error is limited by the trailer brake saturation limit;

classifying, by the processor, the adjustment of brake pedal position into one or more categories of a set of predefined correction categories, based on the adjustment of the brake pedal position and its corresponding effect on the determined error;

when the classified adjustment of brake pedal position is classified into at least one category of the predefined correction categories that indicates a need for remapping of the brake pedal position deceleration map, generating, by the processor, an updated brake pedal position deceleration map configured to mitigate or remove a need to perform further adjustment of brake pedal position to achieve a desired braking effect; and utilizing, by the processor, the updated brake pedal position deceleration map in conjunction with brake pedal position information and vehicle motion information to (i) determine an updated target deceleration of the combination vehicle, and (ii) trigger actuation of the brakes of the combination vehicle responsive to the updated target deceleration.

2. The method of claim 1, wherein the set of predefined correction categories includes an impulsive correction category and a per-braking-cycle repeating correction category, and the at least one category of the predefined correction categories that indicates a need for remapping of the brake pedal position deceleration map includes the per-braking-cycle repeating correction category, and excludes the impulsive correction category.

3. The method of claim 2, wherein:

the set of predefined correction categories further includes: a major correction category, a minor correction category, a smoother correction category, a hook-type correction category, an overshoot correction category, and an undershoot correction category; and wherein the at least one category of the predefined correction categories that indicates a need for remapping of the brake pedal position deceleration map comprises multiple predefined correction categories of the set of predefined correction categories.

4. The method of claim 1, further comprising normalizing the brake pedal position information and the vehicle motion information to at least one of: combination vehicle speed, combination vehicle weight, and condition of a road surface on which the combination vehicle is traveling.

5. The method of claim 1, wherein the generating of the updated brake pedal position deceleration map comprises use of regression analysis.

6. The method of claim 1, wherein the classifying of the adjustment of brake pedal position into one or more categories, and the generating of the updated brake pedal position deceleration map, comprises use of periodogram spectrum estimates resulting from converting time domain data to frequency domain data.

7. The method of claim 6, wherein the periodogram spectrum estimates are found using Welch's overlapped segment averaging estimator.

8. The method of claim 1, wherein the periodic receiving, at the processor, of (i) brake pedal position information and (ii) vehicle motion information, comprises substantially continuously receiving, the (i) brake pedal position information and (ii) vehicle motion information, while the combination vehicle is in motion.

9. The method of claim 1, further comprising indicating to the driver the generation of the updated brake pedal position deceleration map via a user interface of the towing vehicle.

10. A combination vehicle comprising;
at least one trailer;
a towing vehicle configured to pull the at least one trailer;
a brake pedal position sensor associated with a brake pedal of the towing vehicle configured to be actuated by a driver of the towing vehicle to indicate an intended braking effect, the brake pedal position sensor configured to generate brake pedal position information;
a processor; and
a non-transitory computer-readable storage medium having stored instructions which, when executed by the processor, cause the processor to perform operations comprising:
    periodically receiving (i) the brake pedal position information, and (ii) vehicle motion information of the combination vehicle, as inputs to a brake pedal position deceleration map;
    utilizing said brake pedal position information, said vehicle motion information, and said brake pedal position deceleration map to determine a target deceleration of the combination vehicle, and responsive to the determined target deceleration, trigger actuation of brakes of the combination vehicle by transmitting a towing vehicle braking request to the towing vehicle and by transmitting a trailer braking request to the at least one trailer;
    determining an error in actual deceleration of the combination vehicle relative to the target deceleration, and responsive to the determined error, adjusting the trailer braking request to compensate for the determined error, but wherein compensation for the determined error is subject to being limited by a trailer brake saturation limit;
    determining an adjustment of brake pedal position by the driver of the towing vehicle to correct deceleration of the combination vehicle when the determined error is limited by the trailer brake saturation limit;
    classifying the adjustment of brake pedal position into one or more categories of a set of predefined correction categories, based on the adjustment of the brake pedal position and its corresponding effect on the determined error;
    when the classified adjustment of brake pedal position is classified into at least one category of the predefined correction categories that indicates a need for remapping of the brake pedal position deceleration map, generating an updated brake pedal position deceleration map configured to mitigate or remove a need to perform further adjustment of brake pedal position to achieve a desired braking effect; and
    utilizing the updated brake pedal position deceleration map in conjunction with brake pedal position information and vehicle motion information to (i) determine an updated target deceleration of the combination vehicle, and (ii) trigger actuation of the brakes of the combination vehicle responsive to the updated target deceleration.

11. The combination vehicle of claim 10, wherein the set of predefined correction categories includes an impulsive correction category and a per-braking-cycle repeating correction category, and the at least one category of the predefined correction categories that indicates a need for remapping of the brake pedal position deceleration map includes the per-braking-cycle repeating correction category, and excludes the impulsive correction category.

12. The combination vehicle of claim 10, wherein:
the set of predefined correction categories further includes: a major correction category, a minor correction category, a smoother correction category, a hook-type correction category, an overshoot correction category, and an undershoot correction category; and
wherein the at least one category of the predefined correction categories that indicates a need for remapping of the brake pedal position deceleration map comprises multiple predefined correction categories of the set of predefined correction categories.

13. The combination vehicle of claim 10, wherein the stored instructions which, when executed by the processor, cause the processor to further perform an operation comprising:
normalizing the brake pedal position information and the vehicle motion information to at least one of: combination vehicle speed, combination vehicle weight, and condition of a road surface on which the combination vehicle is traveling.

14. The combination vehicle of claim 10, wherein the generating of the updated brake pedal position deceleration map comprises use of regression analysis.

15. The combination vehicle of claim 10, wherein the classifying of the adjustment of brake pedal position into one or more categories, and the generating of the updated brake pedal position deceleration map, comprises use of periodogram spectrum estimates resulting from converting time domain data to frequency domain data.

16. A non-transitory computer-readable storage medium stored within a towing vehicle, the non-transitory computer-readable storage medium having stored instructions which, when executed by a processor, cause the processor to perform operations comprising:
periodically receiving, at the processor, (i) brake pedal position information for a towing vehicle brake pedal actuated by a driver to indicate an intended braking effect, and (ii) vehicle motion information of the combination vehicle, as inputs to a brake pedal position deceleration map;

utilizing, by the processor, said brake pedal position information, said vehicle motion information, and said brake pedal position deceleration map to determine a target deceleration of the combination vehicle, and responsive to the determined target deceleration, trigger actuation of brakes of the combination vehicle by transmitting a towing vehicle braking request to the towing vehicle and by transmitting a trailer braking request to the at least one trailer;

determining, by the processor, an error in actual deceleration of the combination vehicle relative to the target deceleration, and responsive to the determined error, adjusting the trailer braking request to compensate for the determined error, but wherein compensation for the determined error is subject to being limited by a trailer brake saturation limit;

determining, by the processor, an adjustment of brake pedal position by the driver of the towing vehicle to correct deceleration of the combination vehicle when the determined error is limited by the trailer brake saturation limit;

classifying, by the processor, the adjustment of brake pedal position into one or more categories of a set of predefined correction categories, based on the adjustment of the brake pedal position and its corresponding effect on the determined error;

when the classified adjustment of brake pedal position is classified into at least one category of the predefined correction categories that indicates a need for remapping of the brake pedal position deceleration map, generating, by the processor, an updated brake pedal position deceleration map configured to mitigate or remove a need to perform further adjustment of brake pedal position to achieve a desired braking effect; and utilizing, by the processor, the updated brake pedal position deceleration map in conjunction with brake pedal position information and vehicle motion information to (i) determine an updated target deceleration of the combination vehicle, and (ii) trigger actuation of the brakes of the combination vehicle responsive to the updated target deceleration.

17. The non-transitory computer-readable storage medium stored within a towing vehicle of claim 16, wherein the set of predefined correction categories includes an impulsive correction category and a per-braking-cycle repeating correction category, and the at least one category of the predefined correction categories that indicates a need for remapping of the brake pedal position deceleration map includes the per-braking-cycle repeating correction category, and excludes the impulsive correction category.

18. The non-transitory computer-readable storage medium stored within a towing vehicle of claim 16, wherein:

the set of predefined correction categories further includes: a major correction category, a minor correction category, a smoother correction category, a hook-type correction category, an overshoot correction category, and an undershoot correction category; and wherein the at least one category of the predefined correction categories that indicates a need for remapping of the brake pedal position deceleration map comprises multiple predefined correction categories of the set of predefined correction categories.

19. The non-transitory computer-readable storage medium stored within a towing vehicle of claim 16, wherein the stored instructions which, when executed by the processor, cause the processor to further perform an operation comprising: normalizing the brake pedal position information and the vehicle motion information to at least one of: combination vehicle speed, combination vehicle weight, and condition of a road surface on which the combination vehicle is traveling.

20. The non-transitory computer-readable storage medium stored within a towing vehicle of claim 16, wherein the classifying of the adjustment of brake pedal position into one or more categories, and the generating of the updated brake pedal position deceleration map, comprises use of periodogram spectrum estimates resulting from converting time domain data to frequency domain data.

* * * * *